Figure 1:
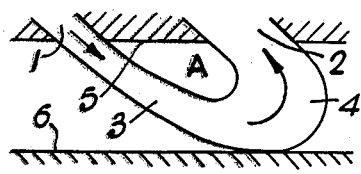

June 15, 1965 W. J. EGGINGTON 3,189,114
VEHICLES FOR TRAVELLING OVER LAND AND/OR WATER
Filed Jan. 16, 1963 4 Sheets-Sheet 3

INVENTOR
W.J. EGGINGTON

BY Cameron, Kerkam & Sutton
ATTORNEYS

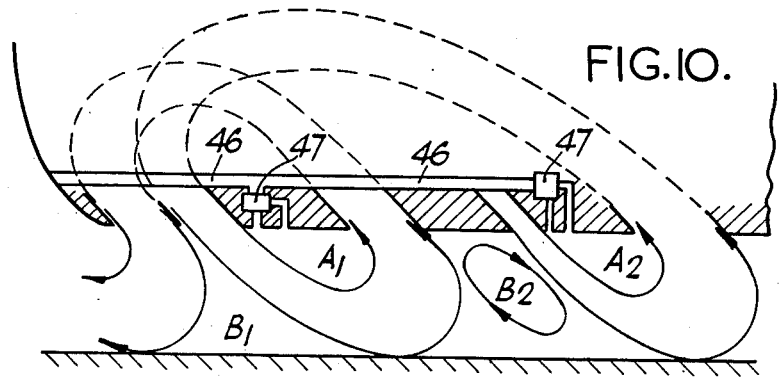
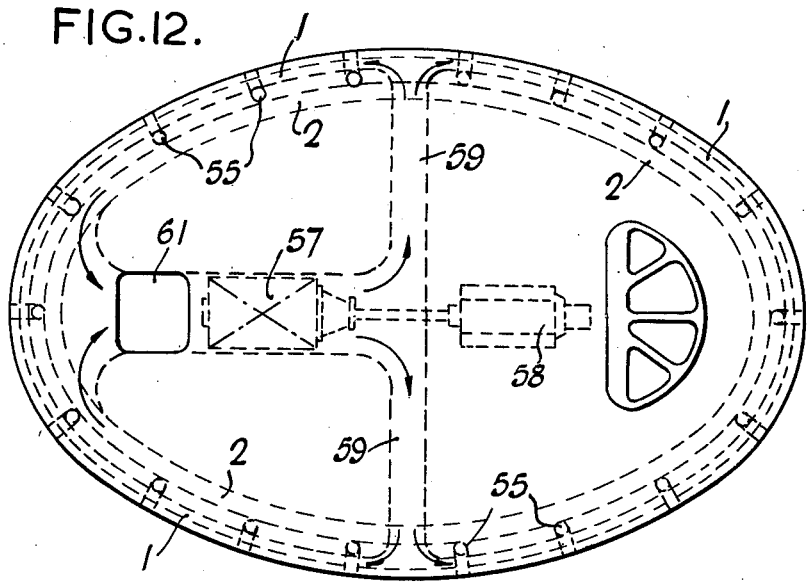
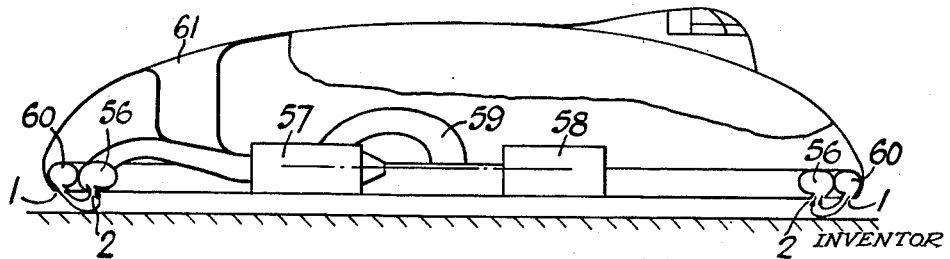

United States Patent Office 3,189,114
Patented June 15, 1965

3,189,114
VEHICLES FOR TRAVELLING OVER
LAND AND/OR WATER
Wilfred James Eggington, Highworth, England, assignor to Hovercraft Development Limited, London, England, a British company
Filed Jan. 16, 1963, Ser. No. 251,813
Claims priority, application Great Britain, Sept. 4, 1959, 30,334/59
18 Claims. (Cl. 180—7)

This application is a continuation-in-part of application Serial No. 52,930, filed August 30, 1960, and relates to vehicles for travelling over land and/or water, of the kind in which the vehicle is supported out of contact with the surface over which it is travelling, or hovering, by a cushion or cushions of fluid, as described in the co-pending application of Christopher Sydney Cockerell Serial No. 627,925, filed December 12, 1956. In such vehicles means are arranged to discharge at least one jet of fluid in the form of a curtain which effectively encloses a space between the underside of the vehicle and the said surface. The jet of fluid has a total thrust which is substantially less than the total weight of the vehicle, the arrangement being such that when the discharging means is in operation pressures can be built up in the said space to form a supporting cushion or cushions of fluid. Such means of supporting a vehicle are equally applicable to vehicles intended for transportation and to structures which are normally intended to remain stationary, for example, for supporting radar installations, and the term vehicle as used hereinafter is to be understood as including all such structures.

In the co-pending application of Christopher Sydney Cockerell, Serial No. 837,428, filed September 1, 1959, there are described discharge means in which at least part of the fluid forming a curtain is caused to circulate to form a further curtain or recirculate in the existing curtain, the fluid jet first flowing from a supply port, in a downward direction, at least part then curving round and flowing upwards into a further port, normally referred to as a recovery port, formed in the bottom of the vehicle, the whole forming a fluid curtain having down-going and up-going limbs. A space is formed by the limbs of the curtain, bounded on one side of the structure of the vehicle.

For any particular width of supply port there is an optimum curtain height. For a particular supply port width there is also an optimum spacing between the supply port and the recovery port but this spacing is also influenced by the ejection angle of the curtain-forming fluid from the supply port, and also the angle of recovery of the fluid into the recovery port. The flow of curtain-forming fluid from the supply port to the recovery port results in the mean pressure in the space bounded by the down-going and up-going limbs of the curtain and the vehicle structure being at a value which is lower than the pressure existing outside the down-going limb of the curtain. Where a single curtain is formed, the pressure outside the down-going limb is atmospheric, the mean pressure in the space being sub-atmospheric. Where two or more parallel curtains are formed with a cushion of pressurised gas formed inside the inner curtain and further cushions of pressurised gas formed between the parallel curtains, the mean pressure in the space between the down-going and up-going limbs of the inner curtain is below the pressure of the cushion formed between the inner curtain and the next succeeding outer curtain.

The pressure in the space between the two limbs of a curtain influences the flow pattern of the fluid curtain. For example the up-going limb is required to sustain a pressure drop which is the difference in pressure between the cushion of pressurised gas inside the curtain and the pressure in the space between the two limbs of the curtain. Therefore any reduction in pressure in this space reduces the pressure of the cushion which the curtain can contain. However, it is desirable that the pressure in the space between the two limbs of the curtain should be at a slightly lower pressure than that which exists outside the down-going limb of the curtain as this results in a small pressure drop across the down-going limb of the curtain and causes this limb to curve inwards slightly and avoids direct impingement of the down-going limb on the surface which would interfere with the smooth flow pattern of the fluid curtain.

It is desirable, therefore, to maintain the pressure in the space bounded by the down-going and up-going limbs of the curtain at a pressure which is slightly lower than the pressure outside the down-going limb but not so low as will adversely affect the pressure of the cushion contained by the curtain. An object of the present invention is the provision of means for supplying fluid to the space between the limbs of a curtain so as to maintain the pressure in the space at a desired value. A further object of the invention is to provide means for controlling the supply of fluid to the space.

The invention is readily applied to vehicles having various forms of curtain configurations, the jet forming the curtain being in the form of a continuous annular jet, or a series of individual jets arranged in an annular jet, or a series of individual jets arranged in an annular manner. Two or more such curtains may be provided, arranged substantially parallel to each other.

Figure 2:
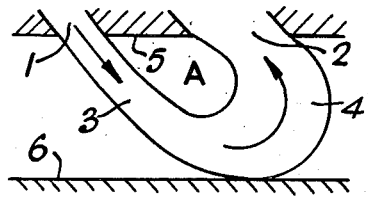
Figure 3:
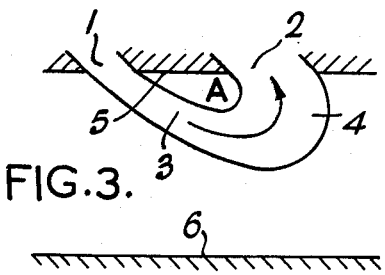
Figure 4:
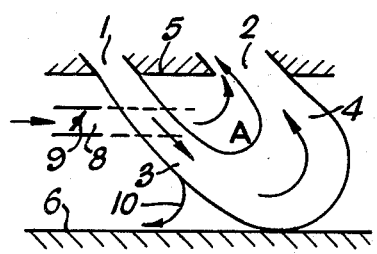
Figure 5:
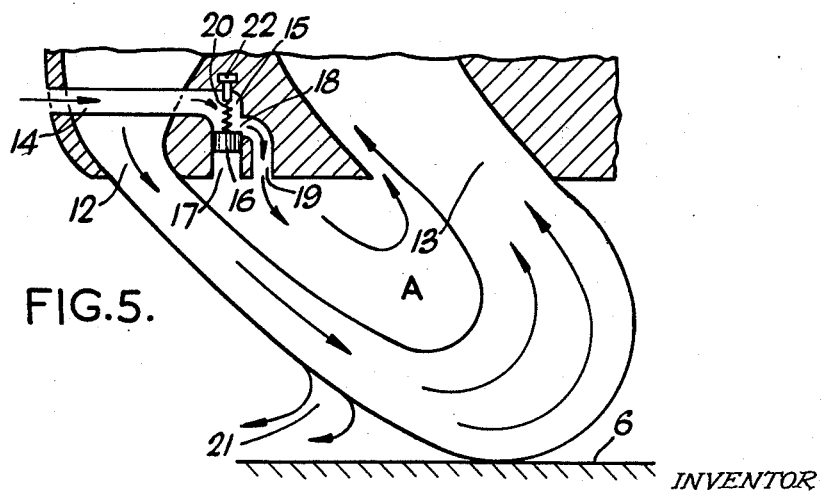
Figure 6:
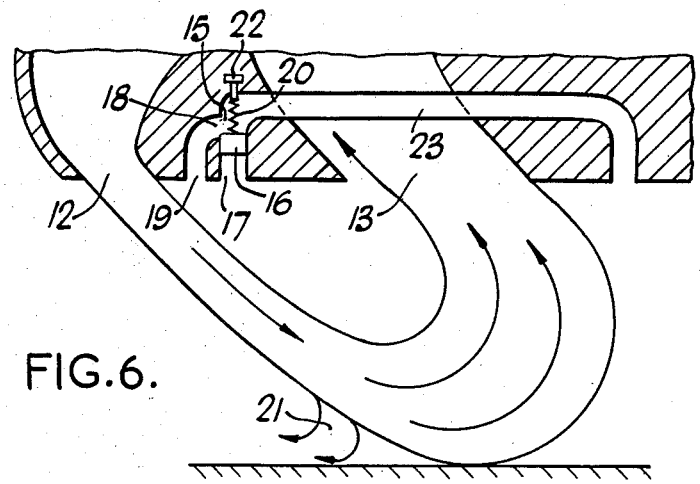
Figure 8:
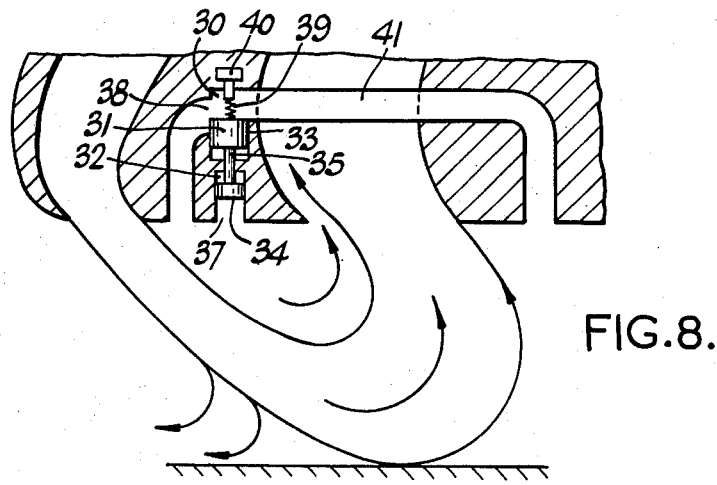
Figure 9:
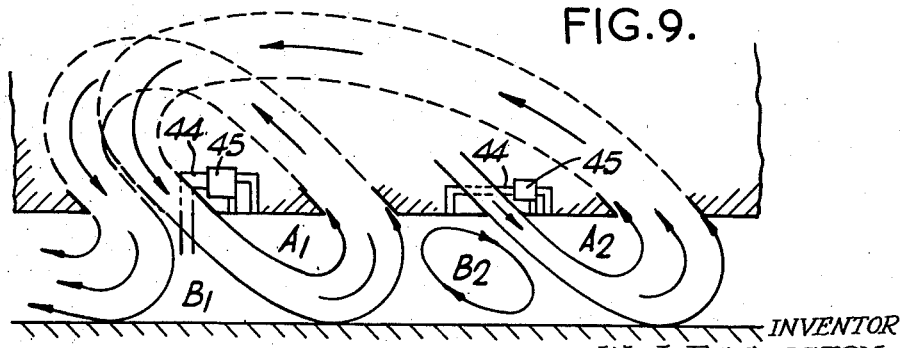
Figure 7:
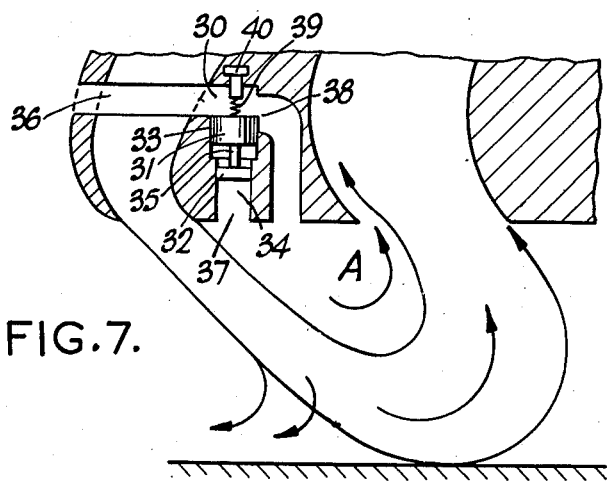
Figure 11:
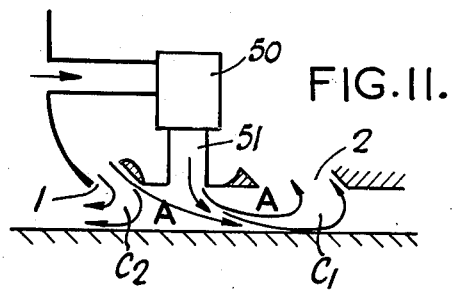
Figure 14:
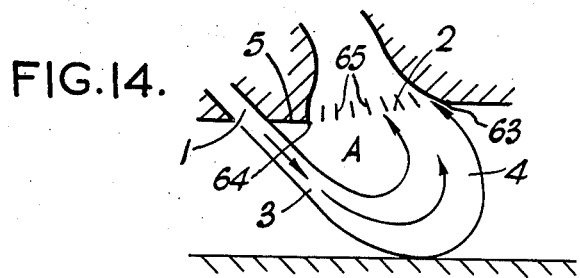

The invention will be readily understood by the following descriptions of certain embodiments in conjunction with the accompanyng drawings, in which:

FIGURE 1 is a diagrammatic illustration of the normal form of curtain configuration at optimum height, FIGURE 2 is a diagrammatic illustration of the curtain form which occurs at heights slightly in excess of the optimum, FIGURE 3 illustrates diagrammatically the curtain configuration which occurs at heights greatly exceeding the optimum, FIGURE 4 illustrates diagrammatically the application of the invention, FIGURE 5 illustrates diagrammatically one particular embodiment of the invention, FIGURE 6 illustrates diagrammatically a further embodiment of the invention, FIGURE 7 illustrates a modification of the embodiment illustrated in FIGURE 5, FIGURE 8 illustrates a modification of the embodiment illustrated in FIGURE 6, FIGURE 9 illustrates diagrammatically the application of the invention to a multi-curtain system, FIGURE 10 illustrates a modification of the embodiment illustrated in FIGURE 9, FIGURE 11 illustrates diagrammatically the operation of the embodiment illustrated in FIGURE 7 when the vehicle is operating at a height considerably less than the optimum, FIGURE 12 is a plan view of a vehicle embodying the invention, FIGURE 13 is a vertical cross-section on the line A—A of FIGURE 12, and FIGURE 14 illustrates diagrammatically a modification which can be applied to the invention.

As illustrated and described in the aforementioned application Serial No. 837,428, the curtain system can be of varying configuration. For each configuration there is an optimum ratio of curtain height to supply port width, which gives an optimum operating height of the vehicle.

FIGURE 1 illustrates for a particular curtain configuration, the flow pattern of the curtain-forming fluid at optimum height. Fluid is expelled from a supply port 1 in an inwards and downwards direction towards the surface 6. After contacting the surface 6, the fluid is then curved round and upward by the pressure of the cushion contained within the curtain, and the curtain-forming fluid flows into a recovery port 2. In such a flow pattern a space or region A is formed, bounded on its outer or outboard side by the downward-going limb 3 and on its inner or inboard side by the upward-going limb 4 of the fluid curtain. At the top the region A is bounded by the bottom 5 of the vehicle. This region A has a pressure which is slightly negative relative to the pressure existing outside the curtain. This slightly negative pressure is caused by the induction of fluid from the space or region A by the flow of curtain forming fluid into the recovery port 2. The pressure in this space or region is not constant across the space, from the outer edge of the recovery port 2 to the inner edge of the supply port 1, as a vortex is generated in the space or region A by the flow of curtain forming fluid, and there is a pressure gradient across the vortex, the pressure being lowest in the centre of the vortex, which approximates to the centre of the space or region A, and highest to the outer surface of the vortex, which is adjacent to the surface of the curtain, i.e. the surface immediately bounding the space or region A. For convenience, it is the mean pressure of the space or region A which is considered. The actual shape of the flow pattern will depend, among other things, on the disposition, size and other variations of the ports, and the pressures acting in the curtain-forming fluid.

Variations in the flow pattern of the fluid curtain will occur whenever the height of the vehicle from the surface varies from the optimum, either up or down. FIGURE 2 illustrates the flow pattern which is likely to occur when the height of the vehicle slightly exceeds the optimum. The fluid curtain is less effective and will only contain a cushion of lower pressure. At heights considerably exceeding the optimum height, the fluid curtain tends to leave the surface and the cushion of fluid supporting the vehicle can escape, the flow pattern assuming the shape shown in FIGURE 3. The pressure in region A varies from that contained at optimum heights whenever the height of the vehicle varies from the optimum. As stated above, at optimum height with optimum curtain flow pattern, as shown in FIGURE 1, the pressure in region A is slightly negative relative to the pressure external to the down-going limb of the curtain. It is desirable for the pressure in the region A to be maintained at this slightly negative pressure, regardless of the variation in flow pattern of the curtain-forming fluid at varying heights. The optimum effectiveness of the curtain can then be obtained over a range of height extending either side of the normal optimum. This is particularly important in operating over rough surfaces, reducing the loads on the vehicle and reducing the response of the vehicle in pitch, roll and heave, over such surfaces.

The fluid used for forming the curtain is generally air, as is also the fluid forming the cushion, and hereinafter will be referred to as such, although other fluids such as exhaust gases and steam may also be used.

FIGURE 4 illustrates, diagrammatically, the application of the invention in its simplest form so that the effectiveness of the air curtain is retained for a range of operating heights of the vehicle, the particular example shown being for a height greater than optimum, being similar to the height shown in FIG. 3. This occurs if the lowest point of the curtain just touches the surface, with the upward-going limb 4 flowing direct into the recovery port 2. This is obtained by admitting air, from the atmosphere outside the curtain, to the region A via an inlet 8 controlled by a valve 9, to maintain the above-mentioned slightly negative pressure. The pressure required in the region A can be readily determined by experimental means. For example, with the vehicle stationary over a firm land surface, when the fluid curtains have been formed together with the pressurised cushion or cushions of gas, the vehicle will attain the optimum height above the surface. The pressure in the region A, or where there are more than one such region, in the various regions A, can be measured by a pressure gauge connected by a small tube to the region A.

As stated above, the slightly negative pressure arises due to the induction of air from the region A into the recovery port by the upward-going limb of the fluid curtain. This induction of air is continuous, and the amount of air admitted from the atmosphere is equal to the amount induced into the recovery port. This induced air can be allowed to travel with the recovered curtain-forming air round the re-energising circuit and issue from the supply port. In this case this extra induced air flow breaks away from the curtain-forming air as the downward-going limb approaches the surface, and flows outwards into the surrounding atmosphere, as indicated by the arrow 10.

The example illustrated in FIGURE 4 is however only schematic in that some means of detecting and indicating a variation of pressure in the region A is required so that the vehicle operator can control the valve 9 as required so as to obtain at all times the desired slightly negative pressure in region A. It is preferable that means are provided whereby variation of the pressure will control directly the admission of air to the region A.

FIGURE 5 illustrates one method of providing such means for a vehicle. Air forming the curtain issues from a supply port 12 flowing initially in a downwards and inwards direction towards the surface, then bending round and upwards, flowing back into the vehicle through a recovery port 13. Air is admitted from the atmosphere external of the curtain via a duct 14, the flow of air through the duct being controlled by a valve 15. The valve 15 comprises a piston 16 mounted in a cylinder 17, the piston controlling the opening of a port 18. Air from the atmosphere enters the duct 14 and flows through the port 18 into a further duct 19 from which it flows into the region A. A tension spring 20 acts on the piston 16, normally tending to hold the piston in a position which closes the port 18. The loading of the spring 20 can be varied by an abutment 22. The abutment 22 is used to set the initial position of the piston 16. This initial setting can readily be carried out with the vehicle operating statically over a firm level surface. When the curtain, and cushion, have been formed and the vehicle is at its normal operating height, the abutment 22 is adjusted until the piston is just about to open port 18. As soon as any of the pressure in region A decreases below the desired value, the piston will move downwardly, opening the port 18, as illustrated in FIG. 5. The extra air which is induced into the recovery port 13 from the region A flows round the energising circuit and flows out of the supply port 12. It flows downwards with the curtain-forming air and then flows outwards into the surrounding atmosphere, as indicated at 21.

As an alternative, the fluid flow into the region A may be from the cushion inside the curtain system. This is illustrated in FIGURE 6. In this case the piston 16 is acted upon by the pressure in the region A and the pressure in the cushion. Air is admitted from the cushion via a duct 23. It is possible to allow the piston 16 to be acted upon by the pressure of the cushion, as for any particular arrangement and geometry of ports and a given mass flow of the curtain-forming fluid there is a definite relationship between the pressure inside the curtain, i.e. the cushion pressure, and the pressure external to the curtain. The initial setting of the valve 15 is made in the same way as when the supply to the region A is from a position external to the curtain.

When the vehicle is travelling over a surface other factors need to be taken into consideration. In my co-pending application Serial No. 61,150, filed October 7, 1960, there is described inter alia the local variation of mass flow of the curtains for efficient formation of the curtains when the vehicle is moving, such variations being dependent on the local variations of the atmospheric pressure immediately outside the curtain due to the movement of the vehicle. In this case the desirable pressure in the region A varies locally around the curtain, due to the variation of the external pressure which may be higher than the normal atmospheric pressure at some locations and lower than the normal atmospheric pressure at other locations. However, the desirable pressure in region A is still one which is slightly less than the pressure immediately external to the curtain and as this external pressure acts on one side of the piston 16 in FIGURE 5, the result will be a consequential increase or decrease in the pressure in region A.

An initial difference in pressure can be obtained in the region A by providing a valve having two pistons of different areas. In the example shown in FIGURE 7 a valve 30 contains two pistons 31 and 32 of different diameters slidably mounted in cylinders 33 and 34, and connected by a rod 35. The larger piston 31 is acted upon by the ambient pressure external to the curtain via duct 36 and the smaller piston 32 is acted upon by the pressure in the region A via duct 37, the two pressures acting in opposing directions. The piston 31 controls the opening of a port 38 in the wall of the cylinder 33 through which fluid passes from outside the curtain into the region A. A spring 39 acts on the piston assembly 31, 32 in a sense such as to tend to close the port 38.

Similarly, as in the valve 15 in FIGURE 5, an adjustable abutment 40 may be provided for the spring 39 in FIGURE 7 for variation of the spring load to provide for a final adjustment of the valve. In this example also, the air flow into the region A, instead of being from the external atmosphere, may be from some other suitable source, such as the cushion, the necessary modification to the valve being made as illustrated in FIGURE 8, air being fed from the cushion via a duct 41.

The invention is also applicable to vehicles having a multi-curtain system, for example, as illustrated schematically in FIGURE 9. In such a system, under static conditions, the pressures at the positions $B_1$ and $B_2$ between curtains are determined by the relative mass flows of the curtains. In the region $A_1$ the pressure is ideally slightly less than the pressure at $B_1$, and the pressure in the region $A_2$ is ideally slightly less than the pressure at $B_2$. The pressures in the regions $B_1$ and $B_2$ are intermediate the atmospheric pressure outside the outermost curtain and the cushion pressure, the pressure in region $B_2$ being higher than that in region $B_1$. Thus in the curtain system shown in FIGURE 9, there is first the external atmospheric pressure, than in region $B_1$ a pressure above atmospheric but below the pressure in region $B_2$, the pressure in region $A_1$ being slightly negative relative to the pressure in region $B_1$. The pressure in $B_2$, as stated above, is above that in region $B_1$ but is below the cushion pressure, the pressure in region $A_2$ being slightly negative to the pressure in region $B_2$. The regions $B_1$ and $A_1$ and the regions $B_2$ and $A_2$ are shown diagrammatically as being connected by ducts 44. In practice valves 45, similar to FIGURE 5 or FIGURE 7, are provided to control the flow of fluid through the ducts 44. Alternatively, the air admitted to the regions $A_1$ and $A_2$ may be provided from various other sources, such as for example, completely outside the curtain system, as illustrated diagrammatically in FIGURE 10, in which a duct 46 connects each region $A_1$ and $A_2$ with the external atmosphere. Valves 47, as in FIGURE 5 or FIGURE 7, control the flow of air to the regions $A_1$ and $A_2$.

While FIGURE 4 relates to the case in which vehicle height is greatly in excess of the optimum, as stated above, the admission of fluid to the region A also improves the effectiveness of the fluid curtain at vehicle heights lower than the optimum. This is illustrated in FIGURE 11 which is of a system similar to that illustrated in FIGURES 5 and 7 but with the vehicle at a much lower height. When the vehicle approaches closely to the surface, the air curtain has difficulty in flowing to the recovery port as the flow path becomes restricted by the clearance between the bottom of the vehicle and the surface. This flow path becomes more restricted as the vehicle gets lower until an air flow pattern somewhat as shown in FIGURE 11 develops. The air flow in essence tends to form a complex curtain system, the air admitted from the atmosphere via the valve 50 flowing from duct 51 to recovery port 2 to form one air curtain $C_1$ while a large part of the air flowing from the supply port 1 flows down and outwards to form a second curtain $C_2$. The remaining part of the air flowing from the support port 1 flows down and inwards to join the air from duct 51. At very low heights, with severe restrction to the flow of air from the supply port to the recovery port, a large negative pressure is liable to develop in the region A, unless large mass flows can take place through the valve 50 and duct 51. These must therefore be capable of passing such mass flows.

For a stationary vehicle, the pressure in the region A needs to be constant all round the vehicle. It will thus be preferable to provide a number of valves 55 positioned around the periphery of the vehicle as shown in FIGURE 12. When the vehicle is travelling over the surface, the ambient pressure immediately outside the fluid curtain varies around the periphery of the vehicle, being above atmospheric at the front varying to sub-atmospheric at the rear. It is desirable therefore for the pressue in the region A to vary similarly. Air flow to the region A may still be by a series of valves as in FIGURE 12, or one or more larger valves may be positioned at the front of the vehicle, the air flowing round inside the region A to the sides and rear of the vehicle, the relative resistance to flow through these regions serving to provide the required pressure variation.

As will be seen in FIGURE 13, the air recovered through the recovery port 2 is fed into a duct 56 and thence to a compressor 57, driven by a motor 58. From the compressor 57, the air is fed via ducts 59 to a supply duct 60 in the bottom of which is formed the support port 1. An auxiliary air intake 61 is provided for admitting air when starting the vehicle, or at any other time when desired.

As the height of the vehicle varies, the point of intersection by the upward flowing limb of the air curtain with the bottom of the vehicle is liable to move inboard or outboard from the ideal position, at which is formed the recovery port. The upward flowing air may thus not flow cleanly into the recovery port, with a resultant lowering of the efficiency of the recovery port. Further, at very low heights, it is possible that the curtain-forming air, instead of flowing into the recovery port, will impinge on the inboard surface of the recovery port. FIGURE 14 illustrates modifications to the recovery port to improve efficiency of recovery. The radial width of the recovery port 2 is wider at its mouth than is normally required, as for example compared with the port shown in FIGURE 1, and the port converges upwardly as indicated in FIGURE 14. To prevent the impingement of the curtain-forming air on to the inboard edge 63 of the port, the inboard edge is raised above the outboard edge 64. By this means, at very low heights, the cushion is able more readily to act on the curtain and deflect it into the recovery port. To still further improve the flow of air into the recovery port, vanes 65 may be provided.

I claim:

1. A vehicle for travelling over a surface of the kind which is at least partly supported above that surface by a cushion of pressurised fluid at least partly formed and contained beneath the vehicle by a curtain of fluid formed from fluid which is discharged from the vehicle, comprising at least one supply port in the bottom of the vehicle, from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a down-going limb of the fluid curtain, at least part of the curtain-forming fluid then being deflected round and upwards by the cushion pressure to form an upward-going limb of the fluid curtain which enters the recovery port, a space being formed by the flow of the curtain-forming fluid bounded on one side by the downward-going limb of the fluid curtain, on another side by the upward-going limb of the fluid curtain and on the third side by the vehicle structure, means for supplying fluid to said space, and means for controlling the pressure in said space in dependence upon the difference between the pressure in said space and the pressure on one side of the curtain.

2. A vehicle as claimed in claim 1 wherein said control means is responsive to a given difference between the pressure in said space and the pressure outboard of the curtain.

3. A vehicle for travelling over a surface of the kind which is at least partly supported above that surface by a cushion of pressurised fluid at least partly formed and contained beneath the vehicle by a curtain of fluid formed from fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a down-going limb of the fluid curtain, at least part of the curtain-forming fluid then being deflected round and upwards by the cushion pressure to form an upward-going limb of the fluid curtain which enters the recovery port, a space being formed by the flow of the curtain-forming fluid bounded on one side by the downward-going limb of the fluid curtain, on another side by the upward-going limb of the fluid curtain and on the third side by the vehicle structure, means for supplying fluid to said space including a duct, a valve in said duct, and means responsive to a given pressure difference between the pressure in said space and the pressure on one side of the curtain for operating said valve.

4. A vehicle for travelling over a surface of the kind which is at least partly supported above that surface by a cushion of pressurised fluid at least partly formed and contained beneath the vehicle by a curtain of fluid formed from fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a down-going limb of the fluid curtain, at least part of the curtain-forming fluid then being deflected round and upwards by the cushion pressure to form an upward-going limb of the fluid curtain which enters the recovery port, a space being formed by the flow of the curtain-forming fluid bounded on one side by the downward-going limb of the fluid curtain, on another side by the upward-going limb of the fluid curtain and on the third side by the vehicle structure, means for supplying fluid to said space including a duct, a valve in said duct having a piston exposed on one side to the pressure in said space and on the other side to the pressure outboard of said curtain, and bias means operating upon said piston and tending to close said valve while permitting said valve to open in response to a given pressure difference between the pressure in said space and the pressure outboard of said curtain.

5. A vehicle as claimed in claim 4 wherein the pressure outboard of said curtain is atmospheric pressure.

6. A vehicle for travelling over a surface of the kind which is at least partly supported above that surface by a cushion of pressurised fluid at least partly formed and contained beneath the vehicle by a curtain of fluid formed from fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a down-going limb of the fluid curtain, at least part of the curtain-forming fluid then being deflected round and upwards by the cushion pressure to form an upward-going limb of the fluid curtain which enters the recovery port, a space being formed by the flow of the curtain-forming fluid bounded on one side by the downward-going limb of the fluid curtain, on another side by the upward-going limb of the fluid curtain and on the third side by the vehicle structure, means for supplying fluid to said space including a duct affording communication between said space and the surrounding atmosphere, a valve in said duct, and means responsive to a given pressure difference between the pressure in said space and the pressure of the surrounding atmosphere for operating said valve.

7. A vehicle for travelling over a surface of the kind which is at least partly supported above that surface by a cushion of pressurised fluid at least partly formed and contained beneath the vehicle by a curtain of fluid formed from fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a down-going limb of the fluid curtain, at least part of the curtain-forming fluid then being deflected round and upwards by the cushion pressure to form an upward-going limb of the fluid curtain which enters the recovery port, a space being formed by the flow of the curtain-forming fluid bounded on one side by the downward-going limb of the fluid curtain, on another side by the upward-going limb of the fluid curtain and on the third side by the vehicle structure, means for supplying fluid to said space including a duct affording communication between said space and the said cushion of pressurised fluid, a valve in said duct, and means responsive to a given pressure difference between the pressure in said space and the cushion pressure for operating said valve.

8. A vehicle for travelling over a surface of the kind which is at least partly supported above that surface by a cushion of pressurised fluid at least partly formed and contained beneath the vehicle by a curtain of fluid formed from fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a down-going limb of the fluid curtain, at least part of the curtain-forming fluid then being deflected round and upwards by the cushion pressure to form an upward-going limb of the fluid curtain which enters the recovery port, a space being formed by the flow of the curtain-forming fluid bounded on one side by the downward-going limb of the fluid curtain, on another side by the upward-going limb of the fluid curtain and on the third side by the vehicle structure, means for supplying fluid to said space including a duct affording communication between the said space and an independent pressurised source, a valve in said duct, and means responsive to a given pressure difference between the pressure in said space and the pressure of said independent pressurised source for operating said valve.

9. A vehicle for travelling over a surface of the kind which is at least partly supported above that surface by a cushion of pressurised fluid at least partly formed and contained beneath the vehicle by a curtain of fluid formed from fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a down-going limb of the fluid curtain, at least part of the curtain-forming fluid then being deflected round and upwards by the cushion pressure to form an upward-going limb of the fluid curtain which enters the recovery port, a space being formed by the flow of the curtain-forming fluid bounded on one side by the downward-going limb of the fluid curtain, on another side by the upward-going limb of the fluid curtain and on the third side by the vehicle structure, means for supplying fluid to said space including a duct, a valve in said duct, means responsive to a given pressure difference between the pressure in said space and the pressure on one side of the curtain for operating said valve, and means operative on the said means responsive to the said given pressure difference for adjusting the given pressure difference at which said responsive means operates said valve.

10. A vehicle as claimed in claim 9 wherein said means for adjusting the pressure difference includes a variable spring abutment.

11. A vehicle as claimed in claim 1 wherein the recovery port converges in radial width upwardly from the mouth thereof.

12. A vehicle as claimed in claim 1 wherein the edge of the recovery port remote from the supply port is higher than the edge adjacent to the supply port.

13. A vehicle for travelling over a surface of the kind which is at least partly supported above that surface by a cushion of pressurised fluid at least partly formed and contained beneath the vehicle by a curtain of fluid formed by fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a downward-going limb of the fluid curtain, at least part of the curtain-forming fluid then being deflected round and upwards by the cushion pressure to form an upward-going limb of the fluid curtain which enters the recovery port, a fluid-containing space being formed by the flow of the curtain-forming fluid bounded on one side by the downward-going limb of the fluid curtain, on another side by the upward-going limb of the fluid curtain and on the third side by the vehicle structure, the pressure of the fluid in said space being less than the cushion pressure inboard of the curtain and the pressure outboard of the curtain, and means for supplying fluid to said space to maintain a given pressure difference between the pressure in said space and one of said pressures inboard and outboard of the curtain.

14. A vehicle for travelling over a surface of the kind which is at least partly supported above that surface by a cushion of pressurised fluid at least partly formed and contained beneath the vehicle by a curtain of fluid formed by fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a downward-going limb of the fluid curtain, at least part of the curtain-forming fluid then being deflected round and upwards by the cushion pressure to form an upward-going limb of the fluid curtain which enters the recovery port, a fluid-containing space being formed by the flow of the curtain-forming fluid bounded on one side by the downward-going limb of the fluid curtain, on another side by the upward-going limb of the fluid curtain and on the third side by the vehicle structure, the pressure of the fluid in said space having a given value in relation to the pressures outboard and inboard of the curtain when the vehicle is stationary at its optimum height above the surface, and means for maintaining the pressure in said space at said given value.

15. A vehicle for travelling over a surface of the kind which is at least partly supported above that surface by a curtain of pressurised fluid at least partly formed and contained beneath the vehicle by a curtain of fluid formed by fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a downward-going limb of the fluid curtain, at least part of the curtain-forming fluid then being deflected round and upwards by the cushion pressure to form an upward-going limb of the fluid curtain which enters the recovery port, a fluid-containing space being formed by the flow of the curtain-forming fluid bounded on one side by the downward-going limb of the fluid curtain, on another side by the upward-going limb of the fluid curtain and on the third side by the vehicle structure, there being a given pressure difference between the pressure of the fluid in said space and the pressure outboard of the curtain when the vehicle is stationary at its optimum height above the surface, means for supplying fluid to said space, and means responsive to variations in said pressure difference for controlling the supply of fluid to said space.

16. A vehicle for travelling over a surface of the kind which is at least partly supported above that surface by a curtain of pressurised fluid at least partly formed and contained beneath the vehicle by a curtain of fluid formed by fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a downward-going limb of the fluid curtain, at least part of the curtain-forming fluid then being deflected round and upwards by the cushion pressure to form an upward-going limb of the fluid curtain which enters the recovery port, a fluid-containing space being formed by the flow of the curtain-forming fluid bounded on one side by the downward-going limb of the fluid curtain, on another side by the upward-going limb of the fluid curtain and on the third side by the vehicle structure, there being a given pressure difference between the pressure of the fluid in said space and the pressure outboard of the curtain when the vehicle is stationary at its optimum height above the surface, means for supplying fluid to said space including a duct connecting said space to the atmosphere outboard of the curtain, and means responsive to variations in said pressure difference for controlling the supply of fluid to said space including a piston type valve in said duct exposed on one side to the pressure in said space and on the other side to the pressure of the atmosphere outboard of said curtain.

17. A vehicle for travelling over a surface of the kind which is at least partly supported above that surface by a curtain of pressurised fluid at least partly formed and contained beneath the vehicle by a curtain of fluid formed by fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a downward-going limb of the fluid curtain, at least part of the curtain-forming fluid then being deflected round and upwards by the curtain pressure to form an upward-going limb of the fluid curtain which enters the recovery port, a fluid-containing space being formed by the flow of the curtain-forming fluid bounded on one side by the downward-going limb of the fluid curtain, on another side by the upward-going limb of the fluid curtain and on the third side by the vehicle structure, there being a given pressure difference between the pressure of the fluid in said space and the cushion pressure when the vehicle is stationary at its optimum height above the surface, means for supplying fluid to said space, and means responsive to variations in said pressure difference for controlling the supply of fluid to said space.

18. A vehicle for travelling over a surface of the kind which is at least partly supported above that surface by a curtain of pressurised fluid at least partly formed and contained beneath the vehicle by a curtain of fluid formed by fluid which is discharged from the vehicle, comprising at least one supply port in the bottom of the vehicle from which the curtain-forming fluid issues, at least one recovery port in the bottom of the vehicle spaced inboard of and substantially parallel to the supply port, the supply port being so constructed and arranged that the curtain-forming fluid first flows downwards and inwards towards the surface to form a downward-going limb of the fluid curtain, at least part of the curtain-forming fluid then being deflected round and upwards by the curtain pressure to form an upward-going limb of the fluid curtain which enters the recovery port, a fluid-containing space being formed by the flow of the curtain-forming fluid bounded on one side by the downward-going limb of the fluid curtain, on another side by the upward-going limb of the fluid curtain and on the third side by the vehicle structure, there being a given pressure difference between the pressure of the fluid in said space and the cushion pressure when the vehicle is stationary at its optimum height above the surface, means for supplying fluid to said space including a duct connecting said space and said cushion, and means responsive to variations in said pressure difference for controlling the supply of fluid to said space including a piston type valve in said duct exposed on one side to the pressure in said space and on the other side to the cushion pressure.

References Cited by the Examiner

UNITED STATES PATENTS

| 1,824,313 | 9/31 | Vogler | 114—67.1 |
| 3,117,645 | 1/64 | Cockerell | 180—7 |
| 3,139,947 | 7/64 | Beardsley | 180—7 |

FOREIGN PATENTS

| 1,240,721 | 8/60 | France. |
| 1,255,604 | 1/61 | France. |

A. HARRY LEVY, *Primary Examiner.*

MILTON BUCHLER, *Examiner.*